March 11, 1952     J. F. MOLLOY     2,588,555
COMBINED VALVE AND WATER SILENCER
Filed May 31, 1946
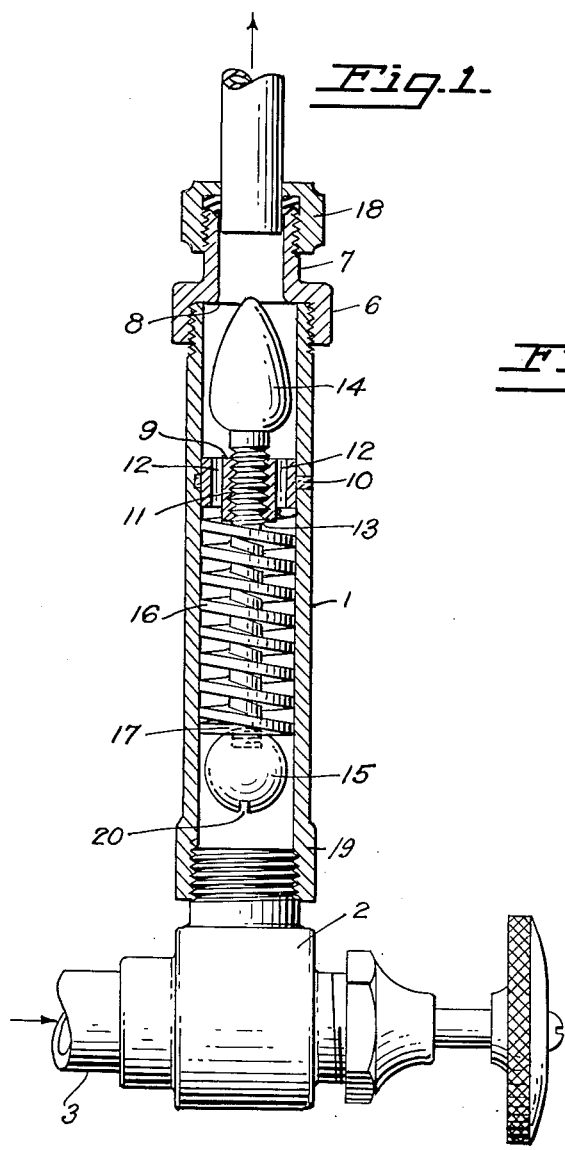
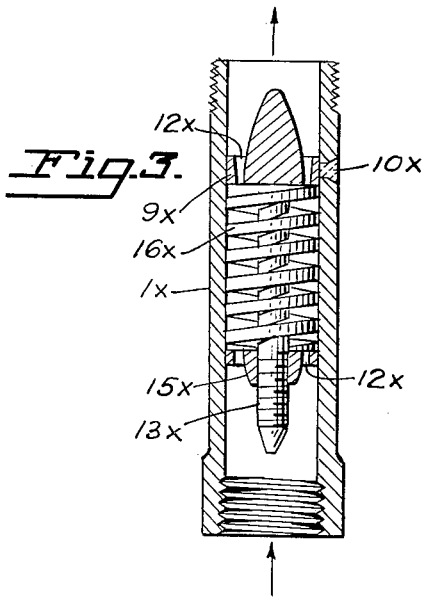
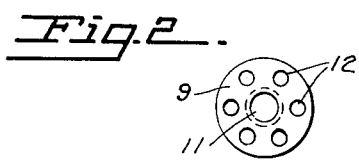
INVENTOR.
JAMES F. MOLLOY
BY Baldwin Vale
ATTORNEY Patented Mar. 11, 1952

2,588,555

UNITED STATES PATENT OFFICE 2,588,555

COMBINED VALVE AND WATER SILENCER

James F. Molloy, Oakland, Calif.

Application May 31, 1946, Serial No. 673,417

4 Claims. (Cl. 137—69)

This invention relates to improvements in water silencers and more particularly to silencers for toilet flushes.

Among the objects of the invention is the provision of means for regulating the volume of water flowing in service pipes.

Another object is to frictionally retard the velocity of water flowing in pipes, by the introduction of means for effecting a helical direction of flow, changing turbulence into a symmetrical flow.

Another object is to prevent the accumulation of sediment in the silencer, a common fault in pressure regulators and similar mechanisms introduced into the flow lines of plumbing.

Other objects and advantages will appear as the description progresses. In the specification and accompanying drawings, the invention is disclosed in its preferred form. But it is to be understood that it is not limited to this form, because it may be embodied in modifications within the spirit of the invention, as defined in the claims following the description.

The introduction of spring controlled valves for regulating the pressure in service pipes is common practice. But so far as I am aware no means have been provided for positively regulating the volume of flow and changing its turbulence to symmetrical laminar flow in a simplified structure and mode of operation similar to the present invention.

In most cities pressure varies in relationship to reservoir proximity and terrain. Master plumbers are aware of this natural pressure difference and select fixtures to suit the location. This silencer will effectively silence water noise in its calibrated range and a plus or minus pressure differential of 10 lbs. Fabricated in three sizes a stamped marking will permit proper selection by plumbers when installing.

In the one sheet of drawings:

Fig. 1 is a vertical section of a water silencer constructed in accordance with this invention.

Fig. 2 is a detail in front elevation of the perforated valve stem guide.

Fig. 3 is a view similar to Fig. 1, showing a modified means for mounting the deflecting helix within the body.

In detail the structure shown in Fig. 1 comprises the tubular body 1, attached to the valve 2, connected with the service pipe 3. The outer end of the body has the reducer 6 threaded thereon and having the reduced outlet 7 with the rounded shoulder 8 which acts as a valve seat.

The valve stem guide 9 closes the passage through the body except for the passage means described hereinafter, and is fixed therein by welding through the countersunk hole through the wall of the body at 10. This guide has the center bore 11, surrounded by a series of longitudinal holes such as 12, see Fig. 2. The center bore 11 is threaded and receives the threaded valve stem 13, adjustable therein.

The streamlined valve 14 is fixed on the outer end of the stem 13 and cooperates with the valve seat at 8 to regulate the flow volume through the body 1.

The spherical head 15 is fixed on the inner end of the stem 13, after the helical velocity retarder 16 is interposed between the guide 10 and the head 15, to form a complete assembly with the valve mechanism.

The velocity retarder 16 is not to be confused with the spring of a spring controlled valve. While it compresses under excess pressures it has no functional effect on the valve 14.

The retarder 16 is preferably composed of a flat ribbon of spring material such as hard brass, bronze or plastic to resist corrosion. It is formed to slightly clear the internal diameter of the body 1, and the external diameter of the stem 13, permitting free longitudinal movement relative to each, and expands or contracts between the head 15 and the guide 9. It is advisable that all parts subjected to contact with water be of non-corrosive material and of such compositions that will not set up electrolysis within the assembly.

The invention operates substantially as follows: The volume of pressure such as water, entering at 3 is deflected around the spherical head 15 in the form of an annulus or laminar. It then enters the helix 16 at 17, then flows between the walls of the helix and through the holes 12. When it meets the valve 14 it is again divided into the form of an annulus or laminar, and passes through the annular passage formed by the valve 14 and the seat 8, it then escapes through the outlet 7 and is conducted by suitable piping to the point of delivery.

The invention may be installed anywhere in a pipe line where air hammer, whistling or gurgling occur, particularly adjacent wash basins and the like where faucets such as 2, are liable to become noisy.

It is especially adapted to silence the flow of water into the flush tanks of toilets where the flow starts suddenly and gradually slows down before the discharge valve closes. Without the present silencer, the water under full pressure rushes out of the outlet at 7 with much whistling, gurgling and other noises undesirable within a home or building where persons may be sleeping or entitled to the quiet operation of the toilet at intervals.

The flowing water changes its form at 15, and travels spirally around in the coils of the retarder. It is split up in passing through the holes 12 and is again modified by the valve 14. These various impediments or baffles in the flow of water break up impounded air pockets into small bubbles which aerate the water and prevent air hammer and other noises caused by such air pockets and the friction of the water under excessive pressure flowing through the pipe system. The retarder 16, being resilient absorbs water hammer which may occur when a valve in the system is too quickly closed. This resilience also functions to scrape the inner wall of the body 1 and the outer surface of the stem 13, preventing the deposit and accumulation of sedimentary matter suspended in the water flow.

The capacity of the valve at 14, 8 may be adjusted by loosening the packed sleeve at 18, unscrewing the body at 19 from the valve. The body can then be swung laterally and a screw driver inserted into the slot 20 in the ball 15 for rotating the stem to readjust the valve 14 relative to the seat 8. Or the body 1 can be dismounted from the line. Such adjustments are rarely necessary, unless service pressure varies materially.

The modification shown in Fig. 3 is similar in function and general structure to that shown in Fig. 1, and comprises the body $1x$, having the stem $13x$, with the integral perforated head $9x$, fixed in the body as described.

The perforated nut $15x$ is threaded on the tapered end of the stem. The resilient helix $16x$ is interposed between the head $9x$ and the nut $15x$, that are both perforated as at $12x$, $12x$ respectively.

Turning up the nut $15x$ compresses the helix $16x$ and restricts the volume of flow through the spiral passage of the helix, performing the same function as the valve 14 and valve seat 8. The helix $16x$ performs the same function as the helix 16, in deflecting the flow of water through the body 1.

The nut $15x$ can be turned by the use of a spanner, instead of a screwdriver as in Fig. 1.

Having fully described this invention and its mode of operation what I claim and desire to secure by Letters Patent is:

1. A water silencer comprising a tubular body having a reduced outlet formed with a valve seat; a valve stem guide fixed in said body and having longitudinal passages formed therethrough; a valve in proximity to said outlet for cooperation with said valve seat; a stem fixed at one end to said valve, projecting through said guide and adjustable therein; a head on the other end of said stem; and a resilient helical velocity retarder interposed between said head and guide in slidable approximate contact with said stem and said tubular body.

2. A water silencer comprising a tubular body having a reduced outlet formed with a valve seat; a valve stem guide fixed in said body and having longitudinal passages therethrough; a streamlined valve in proximity to said outlet for cooperation with said valve seat; a stem fixed at one end to said valve, and threaded in and projecting through said guide, a spherical head on the other end of said stem; and a resilient velocity retarder interposed between said head and guide and composed of flat ribbon-like material with its lateral edges in approximate sliding contact with said stem and body.

3. In a device of the character described comprising a tubular body having an inlet and an outlet and resilient, compressible, spiral means disposed within said body between the inlet and outlet to constrain the flow of fluid through the body to a spiral path, the improvement which comprises a stem extending axially through said spiral means, means at one end of said stem and co-operable therewith to adjust the compression of said spiral means, and valve means at the other end of said stem for cooperation with said outlet to control the flow of fluid therethrough.

4. In a device of the character described comprising a tubular body having an inlet and an outlet and resilient, compressible, spiral means disposed with said body between the inlet and outlet to constrain the flow fluid through the body to a spiral path, the improvement which comprises a stem extending axially through said spiral means, screw means threaded to one end of said stem to adjust the compression of said spiral means, valve means at the other end of said stem for cooperation with said outlet to control the flow of fluid therethrough, and a baffle disc disposed within said tubular body between the inlet and outlet, said disc having holes formed therethrough for passage of fluid.

JAMES F. MOLLOY.

REFERENCES CITED

The following references are of record in the file of this patent:

UNITED STATES PATENTS

| Number | Name | Date |
| --- | --- | --- |
| 1,625,589 | Bletcher | Apr. 19, 1927 |
| 1,833,518 | Ericson | Nov. 24, 1931 |
| 2,038,229 | Martin | Apr. 21, 1936 |